United States Patent Office 3,144,442
Patented Aug. 11, 1964

3,144,442
5-BASIC-SUBSTITUTED-5H-DIBENZ[b,f]AZEPIN-10(11H)-ONE COMPOUNDS
Walter Schindler, Riehen, near Basel, and Hans Blattner, Basel, Switzerland, assignors to Geigy Chemical Corporation, Ardsley, N.Y., a corporation of Delaware
No Drawing. Filed Sept. 11, 1962, Ser. No. 223,301
Claims priority, application Switzerland Nov. 16, 1959
21 Claims. (Cl. 260—239)

The instant invention concerns new N-heterocyclic compounds.

This patent application is a continuation-in-part of pending applications Serial No. 69,302, filed November 15, 1960, and Serial No. 199,249, filed on June 1, 1962 (both abandoned since the filing of the present application).

In one aspect of the invention, it relates to new N-heterocyclic compounds of formula

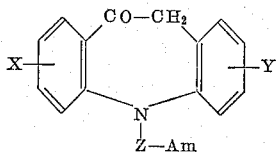

in which X signifies hydrogen, halogen, lower alkyl or lower alkoxy, Y signifies hydrogen, chlorine, bromine or lower alkyl, Z signifies a straight or branched chain alkylene chain containing 2 to 6, preferably 2 to 4 carbon atoms, and Am signifies a lower dialkylamino group, while one of the two alkyl residues of Am may be combined with the alkylene residue Z, or both alkyl residues of Am may be combined among themselves directly or via an oxygen atom, a lower alkylimino, lower hydroxyalkylimino or a lower alkanoyloxyalkylimino group. In particular Am is di-(lower alkyl)-amino, 1-pyrrolidinyl, piperidino, morpholino, 4-methyl-1-piperazinyl, 4-(hydroxy-lower alkyl) - 1 - piperazinyl, e.g. 4-($\beta$-hydroxyethyl)-1-piperazinyl, 4-(lower alkanoyloxy-lower alkyl)-1-piperazinyl, e.g. 4-($\beta$-acetoxyethyl)-1-piperazinyl, or N-methyl-azacycloalkyl with 5 to 7 ring members, e.g. 1-methyl-2-piperidyl, N-methyl-pyrrolidyl, and N-methyl-hexahydroazepinyl.

5-aminoalkyl - 5H - dibenz[b,f]azepin-10(11H)-ones of Formula I have useful pharmacodynamic properties, among which are antiallergic, spasmolytic, anti-emetic and reserpine-antagonistic effects and potentiation of other medicaments, e.g. anaesthetics and analgesics, as pointed out more in detail below. They can be administered perorally or parenterally, the latter preferably in the form of aqueous solutions of their non-toxic salts.

Preferred compounds of Formula I wherein —Z— represents a straight chain alkyl and Am represents dialkylamino and polymethyleneimino radicals are particularly useful because of their strong antihistaminic properties; they are also of interest as psychotropic agents largely free of vegetative and sedative side effects. They may for instance be used in the treatment of a number of allergic conditions such as hay fever, asthma, allergic dermatitis, pruritis of allergic origin, asthmatoid bronchitis and glottis edema.

The compounds of Formula I in which Am represents the last mentioned dialkylamino group and —Z— represents a branched alkylene bridge, particularly the $\beta$-methyl-propylene bridge, are particularly of interest because of their reserpine-antagonistic effect and are, therefore, useful alone or in combination with other mental drugs for the treatment of certain mental disorders such as depressions.

Preferred compounds of Formula I wherein —Z—Am represents N-methyl-azacycloalkyl-alkyl with 5 to 7 ring members, in particular 1-methyl-2-piperidyl, are particularly valuable on account of their spasmolytic properties. They are beneficial in the treatment of spastic conditions of smooth muscle, particularly in the treatment of spastic disturbances of the gastro-intestinal tract, of gastritis and of gastric ulcers.

In another aspect of the present invention, it concerns other new derivatives of 5H-dibenz[b,f]azepin-10(11H)-one which correspond to the general formula

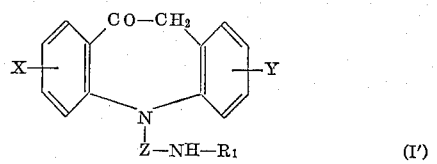

wherein one of the symbols X and Y represents hydrogen, a halogen atom or a lower alkyl radical and the other represents hydrogen, or both of the symbols X and Y simultaneously represent a chlorine atom or a methyl radical, Z represents a lower alkylene radical having a straight or branched chain, and $R_1$ represents a lower alkyl or a lower alkenyl radical.

The preferred derivatives of 5H-dibenz[b,f]azepin-10(11H)-one are embraced by the following general formula

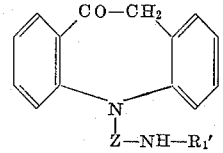

wherein Z represents a lower alkylene radical having a straight or branched chain, and $R_1'$ represents a lower alkyl radical.

In the definition of X and Y the term "halogen" embraces the elements chlorine and bromine, and groups having 1 to 4 carbon atoms are meant by the term "lower" in connection with alkyl.

In the definitions of Z, the term "lower" in connection with alkylene means a group having 2 to 6 carbon atoms and in the definitions of $R_1(R_1')$ the term "lower" in connection with alkyl means a group having 1 to 5 carbon atoms, and in connection with alkenyl a group having 3 or 4 carbon atoms.

In the compounds of the last two formulae, supra, "lower alkyl" is for example, methyl, ethyl, n-propyl, isopropyl, n-butyl, isobutyl, sec. butyl, n-amyl, isoamyl, and "lower alkenyl" is e.g. allyl, methallyl or crotyl, and Z is, for example, the ethylene, propylene, trimethylene, 1-methyl-trimethylene, 2-methyl-trimethylene, 1,3-dimethyl-trimethylene, 2,2-dimethyl-trimethylene, tetramethylene, pentamethylene or hexamethylene radical. Any substituent X or Y appearing alone is, for example, a chlorine or bromine atom or a methyl, ethyl, n-propyl or a n-butyl radical, whereas X and Y in the 3- and 7-positions can each be, e.g. a chlorine atom or a methyl radical, or in the 2- and 8-positions, they can each be a methyl radical.

It has now surprisingly been found that these derivatives of 5H-dibenz[b,f]azepin-10(11H)-one and their salts with inorganic or organic acids, have valuable pharmacological properties, in particular strong reserpine-antagonistic, and also definite serotonin-antagonistic activity. Particularly, the compounds of Formula I" in which $R'_1$ is methyl and —Z— is straight-chain alkylene, e.g. n-propylene, are useful in the treatment of mental disorders, e.g. depressions.

In contrast to the above described tertiary amino derivatives of Formula I, the secondary amino derivatives of Formula I" do, surprisingly, not show the antihistaminic properties of the corresponding tertiary amino derivatives. They are, indeed neither homologs of the latter in the chemical, nor in the pharmacological sense.

The new compounds of Formula I are obtained in good yield when compounds of formula

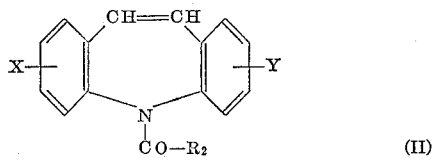

(II)

in which $R_2$ signifies lower alkyl and X and Y have the meanings given above, are reacted with bromine, whereby 5-acyl-10,11-dibromo-10,11-dihydrodibenz[b,f]azepines of formula

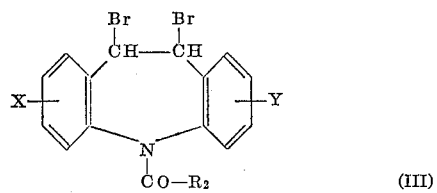

(III)

in which X, Y and $R_2$ have the meanings given above, are obtained, and the dibromoderivatives of Formula III are converted into compounds of formula

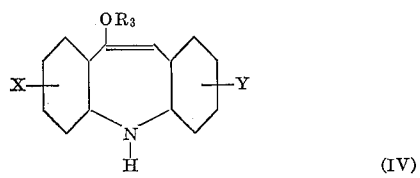

(IV)

wherein $R_3$ is lower alkyl, by treatment with at least two equivalents of an alkali metal lower alkanolate.

In this process, monobromoazepines of formula

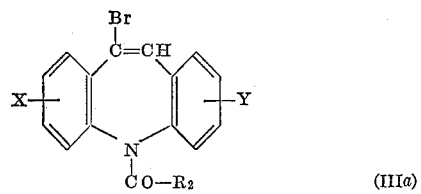

(IIIa)

in which X, Y and $R_2$ have the meanings given above, are first formed by elimination of hydrogen bromide. Such elimination may also be effected in a separate step under mild conditions, either by treatment with an alkali metal lower alkanolate at room temperature, or by treatment with other inorganic or organic bases such as, e.g., sodium or potassium hydroxide in alcoholic or aqueous-alcoholic solution or preferably in dioxan and also at room temperature. Under these mild conditions, monobromo azepines of general Formula IIIa do not react further and thus constitute the reaction products. In the warm, monobromo azepines of Formula IIIa react with alkali metal lower alkanolates to furnish compounds of Formula IV which under more drastic conditions are also obtained directly from the dibromo azepines of Formula III. For such conversion of bromoderivatives of either Formula III or IIIa, a relatively large excess of alkali metal lower alkanolate is preferably used, i.e. about 4–10 mols per mol of azepine compound, in the alkanol corresponding to that of the alkanolate at or near its boiling temperature. Fairly long reaction times, e.g. between 12 and 48 hours, and high concentrations of alkali metal alkanolate are advised in order to achieve complete reaction. The acid residue —CO—$R_2$, e.g. an acetyl residue, suffers base catalyzed alcoholysis during the process, and an ester e.g. an alkanol acetate is formed. Such alcoholysis consumes no alkali metal alkanolate and the formation of the compound of Formula IV may be regarded as ended when all the bromine is present as alkali metal bromide.

Suitable lower alkanols for the alkanolate component and solvent are, for example, methanol, ethanol, n-propanol, n-butanol, isobutanol; methanol and ethanol being preferred if the resulting 10-alkoxy-5H-dibenz[b,f]-azepines of Formula IV are to serve as intermediates.

In the monobromo azepines of general Formula IIIa, and in the corresponding deacylated compounds formed during the reaction, the bromine atom is situated on a double bond and would therefore be expected to be quite inert towards bases such as those employed in the present process. The ready replaceability by an alkoxy group is therefore surprising and it is decisive for the success of the process. The resulting compounds of general Formula IV have the character of enol-ethers and are readily hydrolysed to the corresponding keto-compounds. 10-alkoxy-5H-dibenz[b,f]azepines are useful as antioxidants; they are intermediates for the preparation of 5H-dibenz[b,f]azepin-10(11H)-ones of Formula V below, which in turn can be used for the production of medicinals; they are intermediates for the production of biologically active compounds, useful as medicinals and intermediates for medicinals, when suitable groups are introduced in the 5-position as will be disclosed below.

Starting substances of the general Formula II are, for example, 5-acetyl-5H-dibenz[b,f]azepine, 5-acetyl-3-chloro-5H-dibenz[b,f]azepine, 5-acetyl-3-bromo-5H-dibenz[b,f]azepine, 5-acetyl-3-ethyl-5H-dibenz[b,f]azepine and 5-acetyl-3,7-dichloro-5H-dibenz[b,f]azepine. These compounds may be prepared by acetylation of the corresponding 5H-dibenz[b,f]azepines, but they may also, and preferably, be prepared directly from the corresponding 10,11-dihydro-5H-dibenz[b,f]azepines by acetylation, bromination of the N-acetyl derivatives in the 10 position by means of bromosuccinimide and elimination of hydrogen bromide under conditions which do not affect the N-acetyl group, e.g. by means of aqueous alcoholic alkali hydroxide solutions at temperatures between about 20 and 50° or, preferably, by means of tertiary organic bases such as hot collidine.

The following examples illustrate in more detail the operation of the process according to this aspect of the invention. Parts therein mean parts by weight, and these are to parts by volume as g. are to cm.³. The temperatures are given in degrees centigrade.

*Example 1*

(a) 407 parts of bromine in 250 parts by volume of chloroform are dropped into a solution of 600 parts of 5-acetyl-5H-dibenz[b,f]azepine in 1200 parts by volume of chloroform at 5–10° while stirring. The decolourised solution is then cooled to −10° while stirring, when crystallisation of the 5-acetyl-10,11-dibromo-10,11-dihydro-5H-dibenz[b,f]azepine takes place. It is filtered off by suction and dried in vacuo. Melting point: 136–138°.

(b) 485 parts of the above dibromo compound are dissolved in 1500 parts by volume of dioxan at 40° and the solution is then cooled to 20°, when no crystallisation should occur. A solution of 76 parts of potassium hydroxide in 342 parts by volume of absolute alcohol is added at 20–25° with stirring over a period of 15–25 minutes. The reaction solution is subsequently stirred for approximately 14 hours at room temperature and then poured into 5000 parts of water. The 5-acetyl-10-bromo-5H-dibenz[b,f]azepine thereby crystallises out. It is filtered off by suction and recrystallised from alcohol. Melting point: 109–110°.

(c) 157 parts of 5-acetyl-10-bromo-5H-dibenz[b,f]azepine are introduced into a solution of 50 parts of sodium in 1000 parts by volume of absolute alcohol with vigorous stirring, and the solution is then boiled under reflux for 18 hours. After cooling, the reaction solution while stirring vigorously is poured into 5000 parts of water, when the crude product is precipitated. It is filtered off by suction and dissolved in ether. The ethereal solution is thoroughly washed with water, dried and evaporated. The residue is first of all recrystallised from alcohol and then from ligroin, when 10-ethoxy-5H-dibenz[b,f]azepine of melting point 132–133° is obtained.

10-methoxy-5H-dibenz[b,f]azepine, M.P. 124°, 10-n-butoxy-5H-dibenz[b,f]azepine, M.P. 113–114°, 10-methoxy - 3,7-di-chloro-5H - dibenz[b,f]azepine, M.P. 182–183° and 2-methoxy-10-methoxy-5H-dibenz[b,f]azepine are similarly obtained.

*Example 2*

125 parts of the 5-acetyl-10,11-dibromo-10,11-dihydro-5H-dibenz[b,f]azepine prepared according to Example 1(a) are introduced into a solution of 135 parts of sodium methylate in 1,000 parts by volume of distilled methanol and the whole is boiled under reflux with stirring for 16 hours. Approximately 500 parts by volume of methanol are then distilled off and the remaining reaction mixture is boiled for a further 24 hours under reflux. After cooling, 500 parts of water are slowly added, the precipitated crystals are filtered off with suction, washed thoroughly with water and dried in vacuum at 60° They are then recrystallised from 350 parts by volume of absolute ethanol and the 10-methoxy-5H-dibenz[b,f]azepine of melting point 124° is obtained.

In another aspect of the invention, it relates to 5H-dibenz[b,f]azepin-10(11H)-ones of the general Formula V

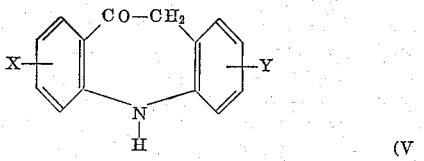

wherein X and Y have the meanings given with Formula I, which are obtained in good yield from 10-alkoxy-5H-dibenz[b,f]azepines of Formula IV by heating these for a short time, e.g. from 5 to 60 minutes in 0.5–5 N aqueous mineral acid, e.g. hydrochloric, sulfuric or phosphoric acid.

5H-dibenz[b,f]azepin-10(11H)-ones of Formula V have not been known up to now. They possess a valuable structural feature in the reactive grouping —CO—CH₂—, which may be derived in a number of ways, and which also accounts for their great versatility as intermediates. On the other hand, the very reactivity of this grouping limits the number of methods suitable for its preparation, the method of the invention being the preferred one. Thus, mono-bromoazepines of Formula IIIa would appear to be suitable starting materials for 5H-dibenz[b,f]azepin-10(11H)-ones of Formula V if the former were subjected to acid or base catalyzed hydrolysis. However, no 5H-dibenz[b,f]azepin-10(11H)one resulted on treatment of 10-bromo-azepines IIIa with aqueous acid, nor on treatment with base in water or water containing organic media.

5H-dibenz[b,f]azepin-10(11H)-ones of Formula V are not only versatile intermediates, e.g. in the production of biologically active compounds useful in medicine; they are also active as antioxidants.

Suitable starting materials of general Formula IV are, e.g. 10-methoxy- or 10-ethoxy-5H-dibenz[b,f]azepine, their 3-chloro-, 3-bromo-, 3-ethyl- and 3,7-dichloro-derivatives, such 10-methoxy- and 10-ethoxy-compounds being preferred. Other suitable starting materials consist of, e.g. the 10-propoxy-, 10-isopropoxy-, 10-butoxy- and 10-amyloxy-derivative of 5H-dibenz[b,f]azepine and its 3-chloro-, 3-bromo-, 3,7-dichloro- and 3-ethyl-derivative. Preferred acids for the hydrolysis according to the invention are hydrochloric and trichloracetic acid.

The following example illustrates in more detail the operation of the process according to this aspect of the invention. Parts therein mean parts by weight, and these are to parts by volume as g. are to cm.³. The temperatures are given in degrees centigrade.

*Example 3*

2 parts of 10-ethoxy-5H-dibenz[b,f]azepine are suspended in 20 parts by volume of 2 N hydrochloric acid and boiled under reflux for 10 minutes, when the suspended substance first of all liquefies and then becomes solid again. The reaction mixture is cooled, and the crude 5H-dibenz[b,f]azepin-10(11H)-one is filtered off by suction and washed with water until neutral. After recrystallisation from alcohol it melts at 145–146°.

The 3,7-dichloro-5H-dibenz[b,f]azepin-10(11H)-one of melting point 318–320° is similarly obtained from 10-methoxy-3,7-dichloro-5H-dibenz[b,f]azepine In another aspect of the invention, it relates to new N-heterocyclic compounds of formula

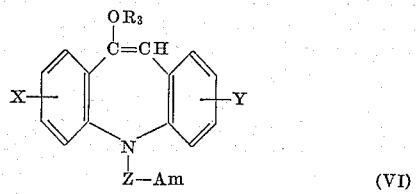

in which R₃ signifies lower alkyl, X signifies hydrogen, chlorine, bromine, lower alkyl or lower alkoxy, Y signifies hydrogen, halogen or lower alkyl, Z signifies a straight or branched chain alkylene chain containing 2 to 6, preferably 2 to 4 carbon atoms, and Am signifies a lower dialkylamino group, while one of the two alkyl residues of Am may be combined with the alkylene residue Z, or both alkyl residues of Am may be combined among themselves, directly or via an oxygen atom, a lower alkylimino, lower hydroxyalkylimino or lower alkanoyloxyalkylimino group. In particular Am is di(lower alkyl)amino, 1-pyrrolidinyl, piperidino, morpholino, 4-methyl-1-piperazinyl, 4-(hydroxy-lower alkyl)-1-piperazinyl, e.g. 4-(β-hydroxyethyl)-1-piperazinyl, 4-(loweralkanoyloxy-lower alkyl)-1-piperazinyl, e.g. 4-(β-acetoxyethyl)-1-piperazinyl, or N-methyl-azacycloalkyl with 5 to 7 ring members, e.g. 1-methyl-2-piperidyl.

10-alkoxy-5-aminoalkyl-5H-dibenz[b,f]azepines of general Formula VI are useful biologically active compounds possessing antiallergic, spasmolytic, anti-inflammatory, reserpine-antagonistic, analgesic and potentiating properties, the latter being evidenced when administered in combination with other medicinals, e.g. anaesthetics and analgesics. They can be administered perorally or parenterally in the form of aqueous solutions of their non-toxic salts.

They are also useful as intermediates in the preparation of other medicinals, notably those of the 5H-dibenz[b,f]azepin-10(11H)-one series.

Preferred compounds of Formula VI having anti-allergic, reserpine-antagonistic and anti-inflammatory properties are those wherein —Z—Am represents the dialkylamino alkyl and polymethyleneimino alkyl moiety. They may be used in the treatment of allergic conditions such as asthma, hay fever and pruritis of allergic origin.

Preferred compounds of Formula VI useful as potentiators, e.g., of anesthetics and analgesics are those wherein —Z—Am represents the 4′-alkylpiperazinyl-(1′)-alkyl moiety. The vegetative side effects caused are of only slight degree.

For the preparation of the new compounds, a 10-alkoxy-5-H-dibenz[b,f]azepine of Formula IV is reacted in the presence of a condensing agent with an aminoalkyl halide of formula

in which Hal signifies chlorine or bromine and Z and Am have the meanings given above.

Suitable condensing agents are, especially, sodamide, lithium amide, potassamide, sodium or potassium, butyl lithium, phenyl lithium or lithium hydride. The reaction may be carried out in the presence of an inert solvent, of which benzene, toluene and xylenes may be mentioned as examples.

Starting substances of the general Formula IV are, for example, 10-methoxy-5H-dibenz[b,f]azepine, 10-ethoxy-5H-dibenz[b,f]azepine, 10-n-butoxy-5H-dibenz[b,f]azepine, 10-n-propoxy-, 10-isopropoxy-, 10-isobutoxy-, 10-n-amyloxy- and 10-isoamyloxy-5H-dibenz[b,f]azepines, 10-methoxy-3,7-dichloro-5H-dibenz[b,f]azepine, 10-ethoxy-, 10-n-propoxy-, 10-isopropoxy-, and 10-n-butoxy-3,7-dichloro-5H-dibenz[b,f]azepines, and 10-methoxy- and 10-ethoxy-3-chloro-5H-dibenz[b,f]azepines. These compounds may be obtained starting from possibly substituted 5-lower alkanoyl-10,11-dihydro-5H-dibenz[b,f]azepines, by bromination in the 10-position with bromosuccinimide, elimination of hydrogen bromide, e.g., by heating with tertiary organic bases such as collidine or treatment with alcoholic caustic potash in the cold, addition of bromine to the 5-lower alkanoyl-5H-dibenz[b,f]azepine formed, treatment of the 10,11-dibromo compounds with alcoholic caustic potash and reaction of the 5-lower alkanoyl-10-bromo-5H-dibenz[b,f]azepines obtained with alkali metal lower alkanolates whereby bromine is replaced by lower alkoxy and the 5-acyl group is split off at the same time.

As examples of suitable aminoalkyl halides of Formula VII may be mentioned: dimethylamino-ethyl chloride, diethylamino-ethyl chloride, methylethylamino-ethyl chloride, β-dimethyl amino-propyl chloride, β-dimethyl-amino-isopropyl chloride, γ-dimethylamino-propyl chloride, γ-dimethylamino-butyl chloride, γ-dimethylamino-β-methyl-propyl chloride, β-(di-n-propylamino)-ethyl chloride, β-(methyl-isopropylamino)-ethyl chloride, β-(di-n-butylamino)-ethyl chloride, β-(di-isobutylamino)-ethyl chloride, pyrrolidinyl-(1)-ethyl chloride, piperidino-ethyl chloride, γ-piperidino-propyl chloride, β-morpholino-ethyl chloride, β-(4-methyl-piperazinyl-(1')-ethyl chloride and 1-methyl-piperidyl-(3)-methyl chloride, as well as the corresponding bromides.

A second process for the preparation of the compounds of Formula VI consists in reacting a compound of formula

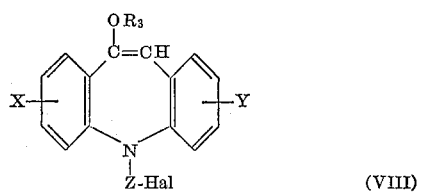

(VIII)

in which $R_3$, X, Y, Z and Hal have the meanings given above, with a secondary amine of formula

(IX)

Am having the meaning given above, but of course no linkage between an alkyl residue of Am and Z can be present. The reaction is carried out, for example, at a moderately high temperature of, for example, 80–120°, in an inert solvent such as a low molecular weight alkanol or alkanone, when an excess of the amine to be reacted is suitably used as an acid binding agent. The reaction may in some cases be carried out in a closed vessel, depending on the boiling point of the amine used and of the solvent, as well as the reaction temperature necessary. Compounds of Formula VIII are obtained, for example, by reacting alkali metal compounds of 10-alkoxy-5H-dibenz[b,f]azepines of the general Formula IV with non-geminal dihaloalkanes, especially those with two different halogen atoms such as lower α-chloro-ω-bromoalkanes. The compounds of Formula VIII are reacted, for example, with dimethylamine, methylethylamine, diethylamine, di-n-butylamine, pyrrolidine, piperidine, morpholine, 4-methyl-piperazine, 4-hydroxyethyl-piperazine, 4-(γ-hydroxypropyl)-piperazine or 4-acetoxyethyl-piperazine.

By adding on to the tertiary amines of the general Formula VI reactive esters, especially halides or sulphates, of aliphatic or araliphatic alcohols, for example, methyl iodide, dimethyl sulphate, ethyl bromide, ethyl iodide or benzyl chloride, monoquaternary ammonium compounds are formed in the usual way, in which case the group Am reacts.

With inorganic or organic acids, such as hydrochloric acid, hydrobromic acid, sulphuric acid, phosphoric acid, methanesulphonic acid, ethanedisulphonic acid, acetic acid, citric acid, malic acid, succinic acid, fumaric acid, maleic acid, tartaric acid, benzoic acid and phthalic acid, the tertiary bases form salts, some of which are water soluble.

The following example illustrates in more detail the preparation of the new compounds VI. Parts therein are parts by weight and these are to parts by volume as grams are to cubic centimeters. The temperatures are given in degrees centigrade.

*Example 4*

12 parts of 10-ethoxy-5H-dibenz[b,f]azepine are dissolved in 50 parts by volume of absolute benzene and the benzene solution of the base consisting of 9 parts of γ-dimethylaminopropyl chloride hydrochloride is added. 2.2 parts of sodamide suspended in toluene are allowed to drop in at 50–60° with stirring, and the reaction mixture is then boiled under reflux for 20 hours. After cooling, it is decomposed with water, the benzene layer is separated and extracted five times with dilute acetic acid. The acid extracts are made alkaline and extracted with ether, the ethereal solution is washed with water, dried over sodium sulphate and evaporated. The oily residue is distilled at high vacuum, when 5-(γ-dimethylamino-propyl)-10-ethoxy-5H-dibenz[b,f]azepine passes over at 160–161° under 0.001 mm. pressure.

The hydrochloride, prepared in ether with absolute alcoholic hydrochloric acid, melts at 166–169°.

In a similar way the following compounds, for example, may be prepared:

5-(β-dimethylamino-ethyl)-10-methoxy-5H-dibenz azepine, M.P. 90°,
5-(γ-piperidino-propyl)-10-methoxy-5H-dibenz[b,f]azepine, B.P.$_{0.01}$ 191–193°,
5-[β-pyrrolidinyl-(1')-ethyl]-10-ethoxy-5H-dibenz[b,f]azepine, B.P.$_{0.001}$ 162°,
5-(γ-dimethylamino-propyl)-10-methoxy-3,7-dichloro-5H-dibenz[b,f]azepine, M.P. 96°,
5-(γ-dimethylamino-propyl)-10-n-butoxy-5H-dibenz[b,f]azepine, B.P.$_{0.003}$ 173°,
5-(γ-dimethylamino-propyl)-10-methoxy-5H-dibenz[b,f]azepine, B.P.$_{0.001}$ 170°,
5-[γ-(4'-methyl-piperazinyl-1')-propyl]-10-methoxy-5H-dibenz[b,f]azepine, B.P.$_{0.03}$ 195°,
2-methoxy-5-(γ-dimethylamino-propyl)-10-methoxy-5H-dibenz[b,f]azepine,
5-(γ-dimethylamino-propyl)-10-methoxy-3,7-dimethyl-dibenz[b,f]azepine.

The preparation of the new compounds of Formula I may be effected by hydrolysis of 5-substituted 10-alkoxy-5H-dibenz[b,f]azepines of the general Formula VI, preferably in acid medium, for example in dilute hydrochloric acid. Suitable starting substances of the general Formula VI are, for example, 5-(β-dimethylamino-ethyl)-10-methoxy-5H-dibenz[b,f]azepine,
5-(γ-dimethylamino-propyl)-10-methoxy-5H-dibenz[b,f]azepine,
5-(γ-dimethylamino-propyl)-10-ethoxy-5H-dibenz[b,f]azepine,
5-[β-pyrrolidinyl-(1')-ethyl]-10-ethoxy-5H-dibenz[b,f]azepine, 5-(γ-dimethylamino-propyl)-10-methoxy-5H-dibenz[b,f]azepine, 5-(γ-dimethylamino-propyl)-10-n-butoxy-5H-dibenz[b,f]azepine, 5-{γ-[4'-methyl-piperazinyl-(1')]-propyl}-10-methoxy-5H-dibenz[b,f]azepine, 5-{γ-[4'-(β-hydroxyethyl)-piperazinyl-(1')]-propyl}-10-methoxy-5H-dibenz[b,f]azepine, 5-{γ-[4'-(γ-hydroxypropyl)-piperazinyl-(1')]-propyl}-10-methoxy-5H-dibenz[b,f]azepine, and 5-(γ-dimethylaminopropyl)-10-methoxy-3,7-dichloro-5H-dibenz[b,f]azepine.

These and further starting materials are obtained, e.g. by the following procedure:

Starting from 5-lower alkanoyl-10,11-dihydro-5H-dibenz[b,f]azepines, substituted if desired, the above compounds may be obtained by brominating in the 10-position with bromosuccinimide, splitting off hydrogen bromide, e.g. by heating with tertiary organic bases such as collidine or treating with alcoholic caustic potash in the cold, adding bromine on to the 5-lower alkanoyl-5H-dibenz[b,f]azepines of Formula II formed, treating the 10,11-dibromo compounds with alcoholic caustic alkali, reacting the 5-lower alkanoyl-10-bromo-5H-dibenz[b,f]azepines of Formula IIIa obtained with alkali metal lower alkanolates to give 10-alkoxy-5H-dibenz[b,f]azepines of Formula IV by simultaneously replacing bromine by lower alkoxy and splitting off the 5-lower alkanoyl group.

The compounds of Formula IV are reacted with amino alkyl halides of Formula VII in the presence of suitable condensing agents such as sodamide, lithium amide, potassamide, sodium or potassium, butyl lithium, phenyl lithium or lithium hydride. The reaction may be carried out in the warm, e.g. in benzene, toluene or xylenes.

By adding reactive esters, especially halides or sulphates, of aliphatic or araliphatic alcohols, e.g. methyl iodide, dimethyl sulphate, ethyl bromide, ethyl iodide or benzyl chloride, to the tertiary amines of the general Formula I, monoquaternary ammonium compounds are formed in the usual way, in which case the group Am reacts.

With inorganic or organic acids, such as hydrochloric acid, hydrobromic acid, sulphuric acid, phosphoric acid, methanesulphonic acid, ethanedisulphonic acid, acetic acid, citric acid, malic acid, succinic acid, fumaric acid, maleic acid, tartaric acid, benzoic acid and phthalic acid, the tertiary bases form salts, some of which are soluble in water.

The following example illustrates in more detail the preparation of the new compounds I. Parts signify therein parts by weight, and these are to parts by volume as grams are to cubic centimeters. The temperatures are given in degrees centigrade.

*Example 5*

10 parts of 5-(β-dimethylamino-ethyl)-10-methoxy-5H-dibenz[b,f]azepine are boiled under reflux in 80 parts by volume of 2 N hydrochloric acid for an hour. After cooling, the reaction solution is made alkaline with concentrated ammonia and the oil which separates is dissolved in ether. The ethereal solution is washed with water, dried and evaporated. When the residue is distilled in high vacuum, 5-(β-dimethylamino-ethyl)-5H-dibenz[b,f]azepin-10(11H)-one of B.P.$_{0.01}$ 174–175°, M.P. 80° is obtained.

The following compounds are obtained in a similar way:

5-(γ-dimethylamino-propyl)-5H-dibenz[b,f]azepin-10(11H)-one, B.P.$_{0.005}$ 174°, 5-(γ-dimethylamino-propyl)-5H-dibenz[b,f]azepin-10(11H)-one, M.P. 87°, 5-(β-morpholino-ethyl)-5H-dibenz[b,f]azepin-10(11H)-one, B.P.$_{0.01}$ 202°, 5-(γ-piperidino-propyl)-5H-dibenz-[b,f]azepin-10(11H)-one, B.P.$_{0.005}$ 188°, 5-γ-[4'-methyl-piperazinyl-(1')-propyl]-5H-dibenz[b,f]azepin-10(11H)-one, M.P. 122°, 5-(γ-dimethylamino-propyl)-3-chloro-5H-dibenz[b,f]azepin-10(11H)-one, 5-(γ-dimethylamino-propyl)-3,7-dichloro-5H-dibenz[b,f]azepin-10(11H)-one, M.P. 87°, 5-(γ-dimethylamino-propyl)-3,7-dimethyl-5H-dibenz[b,f]azepin-10(11H)-one, 5-(γ-dimethylamino-propyl)-2-methoxy-5H-dibenz[b,f]azepin-10(11H)-one, 5-(β-methyl-γ-dimethylamino-propyl)-5H-dibenz[b,f]azepin-10(11H)-one, B.P.$_{0.015}$ 178°, and 5-[β-(1'-methyl-piperidyl-2')-ethyl]-5H-dibenz[b,f]azepin-10(11H)-one, B.P.$_{0.01}$ 202°.

The new compounds of Formula I can also be prepared from compounds of the formula

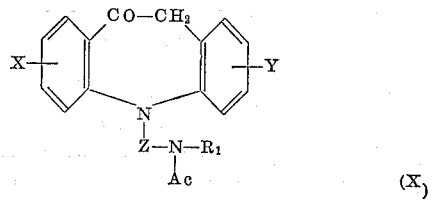

(X)

wherein Ac represents an organic acid radical, in particular a carbalkoxy radical, carbobenzyloxy radical, chlorocarbonyl radical or a cyano radical, and $R_1$, X, Y, and Z have the meanings given above, are hydrolyzed or optionally thermolyzed. Compounds of the general Formula X are hydrolyzed, for example, by treatment with alkali metal hydroxides at a raised temperature in higher boiling organic solvents containing hydroxyl groups such as, e.g. ethylene glycol, diethylene glycol or other low monoalkyl ethers or, preferably in a closed vessel, in low alcohols.

Various processes are available for the production of starting materials of the general Formula X. For example, compounds of this general formula are obtained by reaction of compounds of the general formula

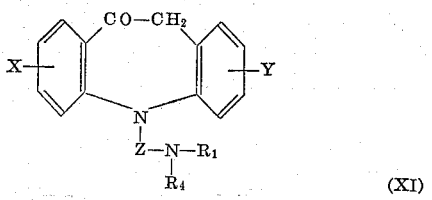

(XI)

wherein $R_4$ represents a lower alkyl or alkenyl radical, in particular a radical identical with $R_1$ or the methyl radical, and X, Y and $R_1$ have the meanings given above, with an organic acid halide or anhydride, particularly a carbonic acid ester chloride (chloroformic acid ester), or phosgene. The reactions of compounds of the general Formula XI, the production of which will be described below, with organic acid halides, e.g. with chloroformic acid methyl ester, ethyl ester, tert. butyl ester or benzyl ester, benzoyl chloride, phosgene, cyanogen bromide or with anhydrides, in particular with acetanhydride, can be performed at room temperature or at a raised temperature in the presence or absence of a suitable solvent such as, e.g. benzene, toluene, diethyl ether diisopropyl ether or tetrahydrofuran. Equimolar amounts or a considerable excess of the acid halides or anhydrides can be used and in the latter case, the excess serves as sole reaction medium. On the addition of an acid halide, often an exothermic reaction occurs with liberation of the alkyl or alkenyl halide containing the radical $R_4$.

Starting materials of the general Formula X wherein Ac represents, e.g. a carbalkoxy, carbobenzyloxy or benzoyl radical are also obtained, by reacting a possibly substituted 10-alkoxy- or 10-alkenyloxy-5H-dibenz[b,f]- azepin of the general Formula IV, in the presence of an alkaline condensing agent such as, e.g. sodium amide, in a suitable inert organic solvent such as, e.g. benzene or toluene, in the warm, e.g. at the boiling temperature of such solvent, with a reactive ester, particularly the chloride or bromide, of a compound of the general formula

(XII)

wherein $R_1$, Z and Ac have the meanings given above but Ac represents in particular a carbalkoxy group, carbobenzyloxy group or benzoyl group, and partially hydrolyzing, preferably in acid medium, e.g. by boiling with aqueous or aqueous/alcoholic hydrochloric acid, the reaction product of the general formula

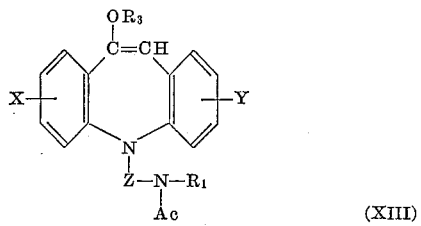
(XIII)

wherein $R_1$, $R_3$, X, Y and Ac have the meanings given above, to form a compound of the general Formula X. Instead of first converting the enol ether group into the oxo group under relatively mild conditions and then splitting off the radical Ac under more energetic conditions according to the process described above, the compounds of the general Formula X need not to be isolated but the compounds of the general Formula XIII can be converted in one step under the hydrolysis conditions given above into those of the general Formula I'.

If the possibly substituted 10-alkoxy-5H-dibenz[b,f]-azepins of the general Formula IV given above are reacted with reactive esters of compounds of the general formula

(XIV)

wherein $R_1$, $R_4$ and Z have the meanings given above, instead of with reactive esters of compounds of the general Formula XII, the reaction being performed under analogous conditions, and then the compounds obtained of the general formula

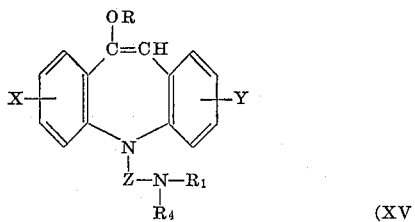
(XV)

wherein $R_3$ is lower alkyl, are hydrolyzed, preferably in acid medium, e.g. by boiling in dilute hydrochloric acid, then the compounds of the general Formula III given above are obtained.

The compounds of the general Formula I' are obtained by a second process by hydrolyzing, preferably in an acid medium, a compound of the general formula

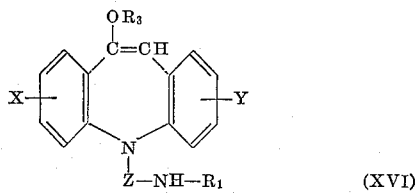
(XVI)

wherein $R_1$, $R_3$, X, Y and Z have the meanings given above. The hydrolysis can be performed, e.g. by heating or boiling in dilute hydrochloric acid.

Starting materials of the general Formula XVI are obtained, for example, by reaction of a reactive ester of a compound of the general formula

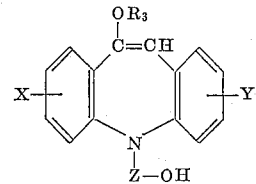
(XVII)

wherein $R_3$, X, Y and Z have the meanings given above, in particular, reaction of a halide with a primary amine of the general formula $$H_2N-R_1 \qquad (XVIII)$$

wherein $R_1$ has the meaning given above. The reaction is performed, for example, at a moderately raised temperature of, e.g. 80–120°, in an inert organic solvent, e.g. in a low alkanol or alkanone, an excess of the amine to be reacted being used advantageously as acid binding agent. Depending on the boiling point of the amine and solvent used as well as on the reaction temperature necessary, it is sometimes necessary to perform the reaction in a closed vessel. Reactive esters of compounds of the general Formula XVII are obtained for example, by reacting alkali metal compounds of possibly substituted 10-alkoxy-5H-dibenz[b,f]azepines of the general Formula IV with non-geminal dihalogen alkanes, in particular those having two different halogen atoms.

A third process for the production of compounds of the general Formula I consists in reacting a reactive ester of a compound of the general formula

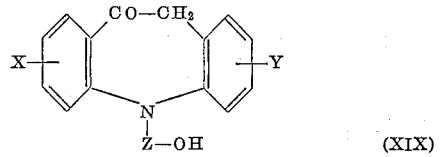
(XIX)

wherein X, Y and Z have the meanings given above, with an amine of the general Formula XVIII given above. The reaction is performed, e.g. in the same manner given under general Formula XVIII. Starting materials of the general Formula XIX are obtained, for example, by partial, preferably acid, hydrolysis of reactive esters of compounds of the general formula XVII, advantageously the halides, for example by heating them with dilute aqueous alcoholic hydrochloric acid.

The compounds of the general Formula I form salts, some of which are water soluble, with inorganic and organic acids such as hydrochloric acid, hydrobromic acid, sulphuric acid, phosphoric acid, methane sulphonic acid, β-hydroxyethane sulphonic acid, ethane disulphonic acid, acetic acid, lactic acid, succinic acid, fumaric acid, maleic acid, malic acid, tartaric acid, citric acid, benzoic acid, salicylic acid and mandelic acid.

Pharmaceutical compositions of the novel compound of Formula I contain this compound admixed with pharmaceutically acceptable organic and/or inorganic solid or liquid carriers suitable for enteral or parenteral administration. They are used, for instance, in the form of tablets, dragées, capsules or in liquid form as solutions, drops, suspensions or emulsions. Such compositions and preparations contain at least 0.5% in the active compound of Formula I. Its percentage in these preparations and compositions, of course, may be varied and may be between about 1% and about 80% of the total weight of a dosage unit. Preferred compositions and preparations are prepared in such a manner that a dosage unit form contains between about 5 mg. and about 50 mg. of the compound of the Formula I.

As excipients for solid compositions, substances which do not react with the active compound can be employed such as, e.g. gelatine, sugar, dextrose, lactose, starches, stearic acid, magnesium or calcium stearate, methyl cellulose, talcum, cholesterol, Aerosil, polyvinylpyrrolidone or any other known carrier for the preparation of solid medicaments. As excipients for liquid preparations, polyvalent alcohols such as, e.g. glycerol, alkylene and polyalkylene glycols such as, e.g. propylene glycol can be used. Water is especially used for the soluble salts of the active compound, for instance for the preparation of injectable solutions. Such injectable solutions may be sterilized and/or contain auxiliary substances such as preserving agents, stabilizing agents, wetting or emulsifying agents, salts for varying the osmotic pressure or buffers. The new compound can also be incorporated into semi-solid substances as cocoa butter etc. which melt within a suitable range, e.g. 34–36° C., to form suppositories. They may also contain other therapeutically useful substances.

Dosage of the pharmacological preparations of the active compound according to the invention has to be individualized. Administered orally, the daily doses vary from about 1 mg. to about 250 mg. of the active compound. The preparations may also be given intramuscularly, intravenously or subcutaneously.

The following example further illustrates the production of a new compound according to the invention. Parts are given therein as parts by weight and their relationship to parts by volume is as that of grams to cubic centimeters. The temperatures are in degrees centigrade.

*Example 6*

41 parts of 5-(γ-dimethylaminopropyl)-5H-dibenz[b,f]azepin-10(11H)-one in 150 parts of anhydrous benzene are quickly added dropwise while stirring to 45 parts of chloroformic acid ethyl ester whereupon the temperature rises to about 45°. On completion of the addition, the reaction mixture is stirred for 4 hours at 45°, then cooled and the benzene solution is thoroughly washed with water after which it is washed three times with dilute hydrochloric acid to remove unchanged starting material. The benzene solution is dried and concentrated wherein 5[γ-(N-carbethoxy-methylamino)-propyl] - 5H - dibenz[b,f]azepin-10(11H)-one is obtained as an oily residue.

29 parts of the above crude product are refluxed for 16 hours with 100 parts of diethylene glycol monoethyl ether, 14 parts of sodium hydroxide and 14 parts of water. After cooling, the reaction mixture is poured into a great deal of water and the oil which separates is taken up in ether. The ethereal solution is extracted four times with 25 parts of 2 N hydrochloric acid. The acid extracts are combined and made alkaline with caustic potash lye. The oil which separates is taken up in ether, the ether solution is dried and concentrated. The residue is distilled under high vacuum whereupon 5-(γ-methylamino-propyl)-5H-dibenz[b,f]azepin-10(11H) - one is obtained. B.P.$_{0.004}$ 175°.

On using the corresponding starting materials the following compounds are obtained by the process described in the above example:

5-(γ-isoamylamino-propyl)-5H-dibenz[b,f]azepin-10(11H)-one,
5-(γ-allylamino-propyl)-5H-dibenz[b,f]azepin-10-(11H)-one,
5-(γ-crotylamino-propyl)-5H-dibenz[b,f]azepin-10(11H)-one,
5-(γ-methylamino-ethyl)-5H-dibenz[b,f]azepin-10(11H)-one,
5-(γ-methylamino-2,2-dimethyl-propyl)-5H-dibenz[b,f]azepin-10(11H)-one,
5-(γ-methylamino-hexyl)-5H-dibenz[b,f]azepin-10(11H)-one,
3-chloro-5-(γ-methylamino-propyl)-5H-dibenz[b,f]azepin-10(11H)-one,
3-bromo-5-(γ-methylamino-propyl)-5H-dibenz[b,f]azepin-10(11H)-one,
3-ethyl-5-(γ-methylamino-propyl)-5H-dibenz[b,f]azepin-10(11H)-one,
3-n-butyl-5-(γ-methylamino-propyl)-5H-dibenz[b,f]azepin-10(11H)-one,
3,7-dichloro-5-(γ-methylamino-propyl)-5H-dibenz[b,f]azepin-10(11H)-one,
2,8-dimethyl-5-(γ-methylamino-propyl)-5H-dibenz[b,f]azepin-10(11H)-one.

What we claim is:
1. A compound selected from the group consisting of an N-heterocyclic compound of the formula

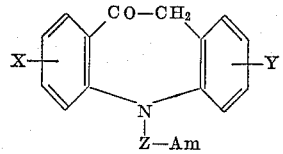

wherein X is a member selected from the group consisting of hydrogen, chlorine, bromine, lower alkyl and lower alkoxy, Y is a member selected from the group consisting of hydrogen, chlorine, bromine and lower alkyl, Z is alkylene with 2 to 6 carbon atoms, and Am is a member selected from the group consisting of di-(lower alkyl)-amino, 1-pyrrolidinyl, piperidino, morpholino, 4-methyl-1- piperazinyl, 4-(β-hydroxyethyl)-1-piperazinyl, 4-(β-acetoxyethyl)-1-piperazinyl, N-methyl-pyrrolidyl, N-methyl-piperidyl and N-methyl-hexahydroazepinyl, and the non-toxic salt thereof with a compatible acid.

2. 5-(β-dimethylamino-ethyl) - 5H - dibenz[b,f]azepin-10(11H)-one.

3. 5-(γ-dimethylamino-propyl) - 5H-dibenz[b,f]azepin-10(11H)-one.

4. 5-(γ-piperidino-propyl) - 5H - dibenz[b,f]azepin-10(11H)-one.

5. 5-γ-[4'-methyl-piperazinyl-(1')]-propyl - 5H - dibenz[b,f]azepin-10(11H)-one.

6. 5-(β-methyl-γ-dimethylamino-propyl) - 5H - dibenz[b,f]azepin-10(11H)-one.

7. 5-[β-(1'-methyl-piperidyl-2')-ethyl] - 5H - dibenz[b,f]azepin-10(11H)-one.

8. A member selected from the group consisting of a compound of the formula

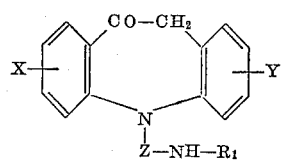

wherein one of the symbols X and Y represents a member selected from the group consisting of hydrogen, chlorine, and bromine, and the other of the symbols X and Y represents hydrogen, both of the symbols X and Y simultaneously represent a member selected from the group consisting of chlorine and methyl, Z represents a member selected from the group consisting of lower straight chained and lower branched chained alkylene, and $R_1$ represents a member selected from the group consisting of lower alkyl and lower alkenyl, and its pharmaceutically acceptable acid addition salts.

9. 5-(γ-methylamino-propyl) - 5H - dibenz[b,f]azepin-10(11H)-one.

10. 5 - (γ-isoamylamino-propyl) - 5H - dibenz[b,f]azepin-10(11H)-one.

11. 5-(γ-allylamino-propyl) - 5H - dibenz[b,f]azepin-10(11H)-one.

12. 5-(γ-crotylamino-propyl) - 5H - dibenz[b,f]azepin-10(11H)-one.

13. 5-(γ-methylamino-ethyl) - 5H - dibenz[b,f]azepin-10(11H)-one.

14. 5-(γ-methylamino-2,2-dimethyl-propyl) - 5H - dibenz[b,f]azepin-10(11H)-one.

15. 5-(γ-methylamino-hexyl) - 5H - dibenz[b,f]azepin-10(11H)one.

16. 3-chloro-5-(γ-methylamino-propyl) - 5H - dibenz[b,f]azepin-10(11H)-one.

17. 3-bromo-5-(γ-methylamino-propyl) - 5H - dibenz[b,f]azepin-10(11H)-one.

18. 3-ethyl-5-(γ-methylamino-propyl) - 5H - dibenz[b,f]azepin-10(11H)-one.

19. 3-n-butyl-5-(γ-methylamino-propyl) - 5H - dibenz[b,f]azepin-10(11H)-one.

20. 3,7-dichloro-5-(γ-methylamino-propyl)-5H-dibenz[b,f]azepin-10(11H)-one.

21. 2,8-dimethyl-5-(γ-methylamino-propyl) - 5H-dibenz[b,f]azepin-10(11H)-one.

References Cited in the file of this patent

Meduna et al.: Journal of Neuropsychiatry, vol. 2, No. 5, June 1961, pp. 232–237.